(12) United States Patent
Liu et al.

(10) Patent No.: US 12,217,653 B2
(45) Date of Patent: Feb. 4, 2025

(54) METHOD AND APPARATUS FOR TRANSMITTING IMAGE DATA

(71) Applicant: BOE Technology Group Co., Ltd., Beijing (CN)

(72) Inventors: Rui Liu, Beijing (CN); Shaolei Zong, Beijing (CN); Xin Duan, Beijing (CN); Wei Sun, Beijing (CN); Jigang Sun, Beijing (CN); Shuhuan Yu, Beijing (CN); Kexin Hao, Beijing (CN); Jiantao Liu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/773,337

(22) PCT Filed: May 10, 2021

(86) PCT No.: PCT/CN2021/092840
§ 371 (c)(1),
(2) Date: Apr. 29, 2022

(87) PCT Pub. No.: WO2022/236601
PCT Pub. Date: Nov. 17, 2022

(65) Prior Publication Data
US 2024/0153433 A1 May 9, 2024

(51) Int. Cl.
*G06T 9/00* (2006.01)
*G09G 3/20* (2006.01)
*H04N 19/182* (2014.01)

(52) U.S. Cl.
CPC .......... *G09G 3/2096* (2013.01); *G06T 9/00* (2013.01); *G09G 2300/0439* (2013.01); *G09G 2330/021* (2013.01); *G09G 2370/00* (2013.01)

(58) Field of Classification Search
CPC .............................. G09G 2370/00; G06T 9/00
See application file for complete search history.

(56) References Cited

U.S. PATENT DOCUMENTS

| 6,157,389 | A | * | 12/2000 | Knowlton | ................. G06T 3/04 345/660 |
| 2011/0242088 | A1 | * | 10/2011 | Kim | ........................ H04L 69/14 345/92 |

(Continued)

FOREIGN PATENT DOCUMENTS

| CN | 102918580 A | 2/2013 |
| CN | 106935224 A | 7/2017 |

(Continued)

*Primary Examiner* — William Boddie
*Assistant Examiner* — Bipin Gyawali
(74) *Attorney, Agent, or Firm* — IPro, PLLC

(57) ABSTRACT

Provided is a method for transmitting image data. The method includes acquiring initial image data of a to-be-displayed image in a display panel, wherein the display panel includes a plurality of pixels, and the initial image data includes pixel data of the plurality of pixels; compressing pixel data of a plurality of first pixels in the initial image data to acquire at least one piece of compressed pixel data, wherein the plurality of first pixels are disposed in a non-foveal region of the display panel, and a plurality of second pixels are disposed in a foveal region of the display panel; sending compressed image data to a driver chip of the display panel, wherein the compressed image data comprises the at least one piece of compressed pixel data and pixel data of the plurality of second pixels.

15 Claims, 9 Drawing Sheets

(56) References Cited

U.S. PATENT DOCUMENTS

| | | | |
|---|---|---|---|
| 2014/0301641 A1* | 10/2014 | Zhong | G09G 5/393 |
| | | | 382/238 |
| 2018/0137598 A1* | 5/2018 | Spitzer | G09G 3/001 |
| 2019/0272801 A1 | 9/2019 | Li et al. | |
| 2019/0273910 A1 | 9/2019 | Malaika | |
| 2020/0098080 A1* | 3/2020 | Bae | G06T 1/20 |
| 2021/0183341 A1 | 6/2021 | Shi et al. | |
| 2021/0366339 A1* | 11/2021 | Kim | G09G 5/008 |
| 2022/0414939 A1* | 12/2022 | Pillai | G06T 15/205 |

FOREIGN PATENT DOCUMENTS

| | | |
|---|---|---|
| CN | 107317987 A | 11/2017 |
| CN | 108391133 A | 8/2018 |
| CN | 111819798 A | 10/2020 |

\* cited by examiner

| K1 | CRTL_L | Invalid pixel data | K2 | IDLE (Idle) |

| K1 | CRTL_L | Pixel data of last row of second pixels | K2 | IDLE (Idle) |

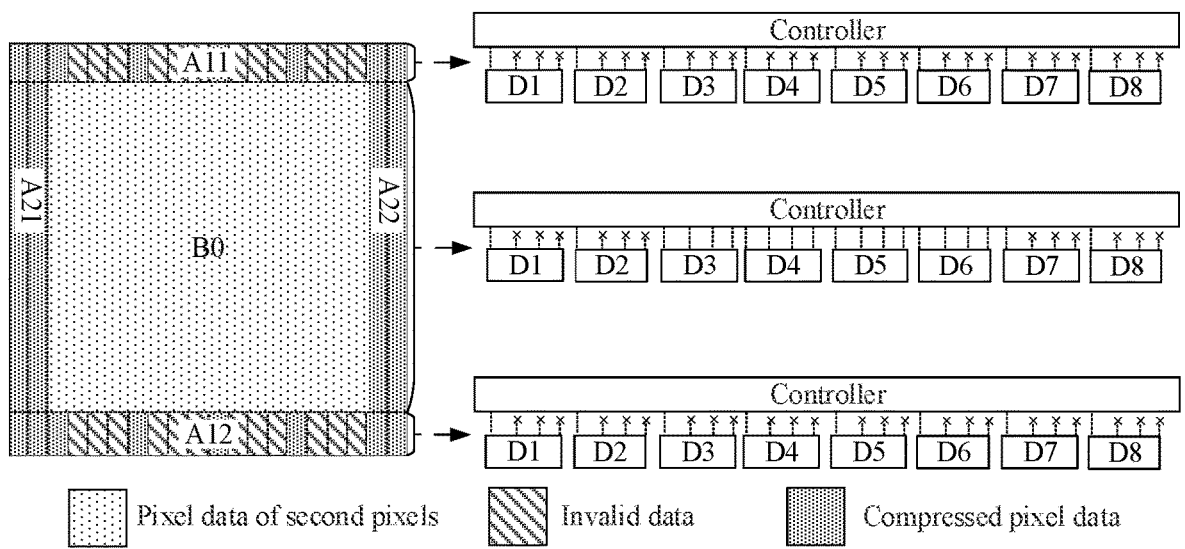
FIG. 11
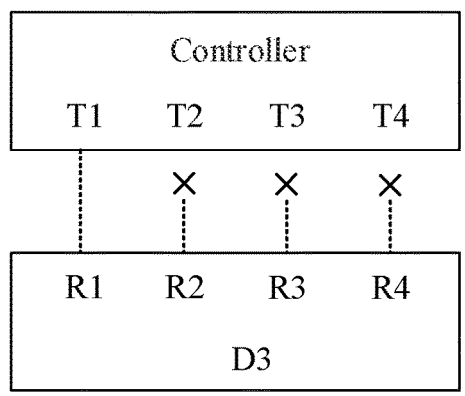
FIG. 12
| Clock training pattern | LSP | K1 | CRTL_L | Compressed pixel data of (N+1)$^{th}$ row of first pixels from the bottom | K2 | IDLE (Idle) |
FIG. 13

METHOD AND APPARATUS FOR TRANSMITTING IMAGE DATA

CROSS-REFERENCE TO RELATED APPLICATION

The present disclosure is a U.S. national phase application based on PCT/CN2021/092840, filed on May 10, 2021, which is incorporated herein by reference in its entirety.

TECHNICAL FIELD

The present disclosure relates to the field of display technologies, and in particular, to a method and an apparatus for transmitting image data.

BACKGROUND

A display apparatus generally includes a timer controller (TCON), a driver circuit, and a display panel. The TCON can transmit image data of a to-be-displayed image to the driver circuit, and the driver circuit can drive the display panel to display the image based on the image data.

SUMMARY

The present disclosure provides a method and an apparatus for transmitting image data. The technical solutions are as follows.

In a first aspect, a method for transmitting image data is provided. The method is applied to a transmission component for image data and includes:
acquiring initial image data of a to-be-displayed image in a display panel, wherein the display panel includes a plurality of pixels, and the initial image data includes pixel data of the plurality of pixels;
compressing pixel data of a plurality of first pixels in the initial image data to acquire at least one piece of compressed pixel data, wherein the plurality of first pixels are disposed in a non-foveal region of the display panel, and a plurality of second pixels in the plurality of pixels other than the plurality of first pixels are disposed in a foveal region of the display panel; and
sending compressed image data to a driver chip of the display panel, wherein the compressed image data includes the at least one piece of compressed pixel data and pixel data of the plurality of second pixels, and the compressed image data is configured for driving the display panel to display by the driver chip.

Optionally, the non-foveal region includes a first region, wherein the first region and the foveal region of the display panel are arranged in a pixel column direction; and
compressing pixel data of the plurality of first pixels in the initial image data to acquire at least one piece of compressed pixel data includes:
compressing pixel data of N rows and M columns of first pixels in the first region to acquire one piece of compressed pixel data, both N and M being integers greater than 1.

Optionally, the non-foveal region includes a second region, wherein the second region and the foveal region are arranged in a pixel row direction; and
compressing pixel data of the plurality of first pixels in the initial image data to acquire at least one piece of compressed pixel data includes:
compressing pixel data of M columns of first pixels disposed in a same row in the second region to acquire one piece of compressed pixel data, M being an integer greater than 1.

Optionally, the M columns of first pixels are connected to a same driver chip.

Optionally, prior to compressing the pixel data of the plurality of first pixels in the initial image data, the method further includes:
determining, based on data acquired by a foveal region detection sensor, the foveal region.

Optionally, compressing pixel data of the plurality of first pixels in the initial image data to acquire at least one piece of compressed pixel data includes:
deleting pixel data of at least one first pixel in the pixel data of the plurality of first pixels to acquire at least one piece of compressed pixel data;
wherein each compressed pixel data is pixel data of one of the first pixels, or a mean value or median value of pixel data of at least two first pixels.

Optionally, the transmission component for image data is a processor in a display apparatus, and the display apparatus further includes a controller connected to the driver chip; sending the compressed image data to the driver chip of the display panel includes:
sending, by the processor, the compressed image data to the controller, wherein the compressed image data is configured to be transmitted to the driver chip by the controller.

Optionally, the transmission component for image data is a controller in a display apparatus, and the controller is connected to at least one driver chip; and sending compressed image data to the driver chip of the display panel includes:
sending a power consumption reduction instruction to a target driver chip, the power consumption reduction instruction being configured to instruct the target driver chip to close a target channel, wherein the target driver chip is a driver chip for driving the first pixels and is provided with a plurality of data channels, and the target channel is a channel for receiving the compressed pixel data; and
sending the compressed pixel data to the target driver chip, and sending the pixel data of the plurality of second pixels to a driver chip for driving the plurality of second pixels in the plurality of driver chips.

Optionally, the non-foveal region includes the first region, wherein the first region and the foveal region of the display panel are arranged in the pixel column direction; pixels connected to the target driver chip include the first pixels and the second pixels, wherein the first pixels and the second pixels are sequentially arranged in a driving direction of a pixel row;
sending the pixel data of the plurality of second pixels to the driver chip for driving the plurality of second pixels in the plurality of driver chips includes:
sending a power consumption recovery instruction to the target driver chip, the power consumption recovery instruction being configured to instruct the target driver chip to open the target channel; and
sending the pixel data of the second pixels connected to the target driver chip to the target driver chip; wherein an interval duration between sending the power consumption recovery instruction to the target driver chip and sending the pixel data of the second pixels is greater than or equal to a duration threshold.

Optionally, sending the power consumption recovery instruction to the target driver chip includes:
sending a clock training pattern and a link stable pattern to the target driver chip.

In a second aspect, a method for transmitting image data is provided. The method is applied to a controller in a display apparatus, the controller being connected to at least one driver chip in the display apparatus; and the method includes:
acquiring compressed image data of a to-be-displayed image in a display panel, the compressed image data including at least one piece of compressed pixel data and pixel data of a plurality of second pixels, wherein the at least one piece of compressed pixel data is acquired by compressing pixel data of a plurality of first pixels, the plurality of first pixels are disposed in a non-foveal region of the display panel, and the plurality of second pixels are disposed in a foveal region of the display panel;
sending a power consumption reduction instruction to a target driver chip, the power consumption reduction instruction being configured to instruct the target driver chip to close a target channel, wherein the target driver chip is a driver chip for driving the first pixels, the target driver chip is provided with a plurality of data channels, and the target channel is a channel for receiving the compressed pixel data; and
sending the compressed pixel data to the target driver chip, and sending the pixel data of the plurality of second pixels to a driver chip for driving the plurality of second pixels in the at least one driver chip.

Optionally, the non-foveal region includes a first region, wherein the first region and the foveal region of the display panel are arranged in a pixel column direction; pixels connected to the target driver chip include the first pixels and the second pixels, wherein the first pixels and the second pixels are sequentially arranged in a driving direction of a pixel row; and
sending the pixel data of the plurality of second pixels to the driver chip for driving the plurality of second pixels in the plurality of driver chips includes:
sending a power consumption recovery instruction to the target driver chip, the power consumption recovery instruction being configured to instruct the target driver chip to open the target channel; and
sending the pixel data of the second pixels connected to the target driver chip to the target driver chip; wherein an interval duration between sending the power consumption recovery instruction to the target driver chip and sending the pixel data of the second pixels is greater than or equal to a duration threshold.

In a third aspect, a method for displaying images is provided. The method is applied to a driver chip in a display apparatus, the driver chip being connected to a display panel; and the method includes:
receiving compressed pixel data, wherein the compressed pixel data is acquired by compressing pixel data of a plurality of first pixels in the display panel, and the plurality of first pixels are disposed in a non-foveal region of the display panel; and
driving the plurality of first pixels by the compressed pixel data.

In a fourth aspect, a transmission component for image data is provided. The transmission component includes:
an acquiring module, configured to acquire initial image data of a to-be-displayed image in a display panel, wherein the display panel includes a plurality of pixels, and the initial image data includes pixel data of the plurality of pixels;
a compressing module, configured to compress pixel data of a plurality of first pixels in the initial image data to acquire at least one piece of compressed pixel data, wherein the plurality of first pixels are disposed in a non-foveal region of the display panel, and a plurality of second pixels in the plurality of pixels other than the plurality of first pixels are disposed in a foveal region of the display panel; and
a sending module, configured to send compressed image data to a driver chip of the display panel, wherein the compressed image data includes the at least one piece of compressed pixel data and pixel data of the plurality of second pixels, and the compressed image data is configured for driving the display panel to display by the driver chip.

In a fifth aspect, a controller is provided. The controller is connected to at least one driver chip in a display apparatus; and the controller includes:
an acquiring module, configured to acquire compressed image data of a to-be-displayed image in a display panel, the compressed image data including at least one piece of compressed pixel data and pixel data of a plurality of second pixels, wherein the at least one piece of compressed pixel data is acquired by compressing pixel data of a plurality of first pixels, the plurality of first pixels are disposed in a non-foveal region of the display panel, and the plurality of second pixels are disposed in a foveal region of the display panel; and
a sending module, configured to send a power consumption reduction instruction to a target driver chip, the power consumption reduction instruction being configured to instruct the target driver chip to close a target channel, wherein the target driver chip is a driver chip for driving the first pixels, the target driver chip is provided with a plurality of data channels, and the target channel is a channel for receiving the compressed pixel data;
wherein the sending module is further configured to send the compressed pixel data to the target driver chip, and send the pixel data of the plurality of second pixels to a driver chip for driving the plurality of second pixels in the at least one driver chip.

In a sixth aspect, a driver chip is provided. The driver chip is connected to a display panel; and the driver chip includes:
a receiving module, configured to receive compressed pixel data, wherein the compressed pixel data is acquired by compressing pixel data of a plurality of first pixels in the display panel, and the plurality of first pixels are disposed in a non-foveal region of the display panel; and
a driving module, configured to drive the plurality of first pixels by the compressed pixel data.

In a seventh aspect, a display apparatus is provided. The display apparatus includes: a processor, a controller, at least one driver chip, and a display panel;
wherein the processor is the transmission component as described in the fourth aspect above; the controller is the transmission component as described in the fourth aspect above or the controller as described in the fifth aspect above; and the driver chip is the driver chip as described in the sixth aspect above.

In an eighth aspect, a display apparatus is provided. The display apparatus includes: a processing component and a memory for storing one or more instructions executable by the processing component; wherein the one or more instructions in the memory, when executed by the processing component, cause the processing component to perform the method for transmitting image data as described in any one of the first to third aspects above.

In a ninth aspect, a computer-readable storage medium is provided. The computer-readable storage medium stores one or more instructions therein, wherein the one or more instructions, when executed by a processing component, cause the processing component to perform the method for transmitting image data as described in any one of the first to three aspects above.

In a tenth aspect, a computer program product including one or more instructions is provided. The computer program product, when running on a computer, causes the computer to perform the method for transmitting image data as described in any one of the first to three aspects above.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and those skilled in the art can still derive other drawings from these accompanying drawings without creative efforts.

FIG. 11 is a schematic diagram of transmitting compressed image data to a driver chip by a controller according to an embodiment of the present disclosure;

FIG. 12 is a schematic diagram of a data channel of a driver chip according to an embodiment of the present disclosure;

FIG. 13 is a schematic diagram of a row of display data sent by another controller according to an embodiment of the present disclosure;

DETAILED DESCRIPTION

To make the objectives, technical solutions, and advantages of the present disclosure clearer, embodiments of the present disclosure will be described in detail with reference to the accompanying drawings. Obviously, the described embodiments are only part but not all of the embodiments of the present disclosure. All other embodiments obtained by those skilled in the art without creative efforts based on the embodiments in the present disclosure are within the protection scope of the present disclosure.

Figure 1:
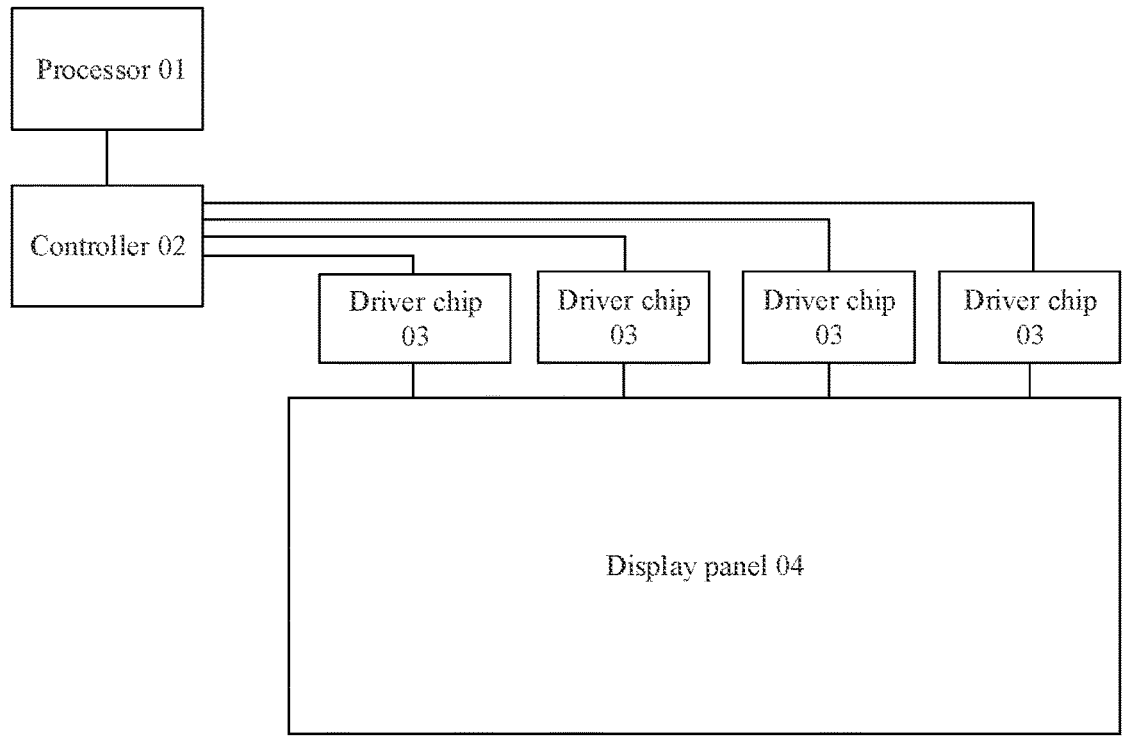
FIG. 1 is a schematic structural diagram of a display apparatus according to an embodiment of the present disclosure.

FIG. 1 is a schematic diagram of an application environment of a method for transmitting image data according to an embodiment of the present disclosure. As shown in FIG. 1, the method for transmitting image data may be applied to a display apparatus, and the display apparatus includes: a processor 01, a controller 02, at least one driver chip 03, and a display panel 04. For example, four driver chips 03 are shown in FIG. 1. The processor 01 may be a graphics processing unit (GPU) or an application processor (AP). The controller 02 may be a timer controller (TCON). Each driver chip 03 may be a source electrode driver chip. The driver chip 03 may also be referred to as a driver integrated circuit (driver IC).

Referring to FIG. 1, it can be seen that the processor 01 is connected to the controller 02 and may be configured to transmit image data of a to-be-displayed image to the controller 02. The controller 02 is also connected to the at least one driver chip 03 and configured to transmit the image data to each driver chip 03. The at least one driver chip 03 is connected to the display panel 04, and each driver chip 03 is configured to drive pixels in the display panel 04 based on the received image data, such that the display panel 04 displays the image.

The image data of the to-be-displayed image may include pixel data of the plurality of pixels in the display panel 04, and the pixel data may refer to color values of the pixels. For example, the color values may include red green blue (RGB) color values.

With the rapid development of display industry, users have higher and higher requirements on a picture quality of the display panel, which further puts forward higher requirements on a picture refresh rate and a resolution of the display apparatus. In the case that the refresh rate and resolution of the display apparatus are to be improved, a data volume of the image data transmitted from the processor 01 to the controller 02 is doubled, and a data volume of the image data transmitted from the controller 02 to the driver chip 03 is doubled. Therefore, not only a power consumption of the display apparatus is significantly increased, but also higher requirements is put forward on a data transmission bandwidth between the processor 01 and the controller 02 in the display apparatus, as well as a data transmission bandwidth between the controller 02 and the driver chip 03, leading to a relatively high cost of the display apparatus. For example, a large number of data channels (which may also be referred to as transmission interfaces) of the driver chip 03 are required, and the cost of the driver chip 03 is relatively high.

Figure 2:
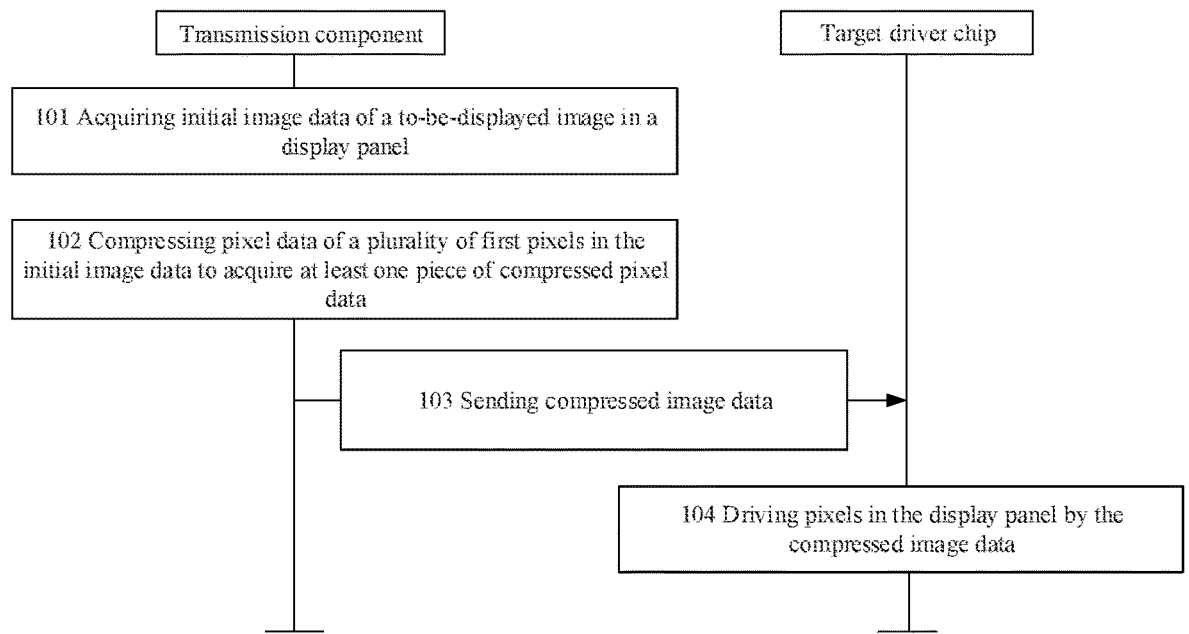
FIG. 2 is a flowchart of a method for transmitting image data according to an embodiment of the present disclosure.

FIG. 2 is a flowchart of a method for transmitting image data according to an embodiment of the present disclosure, and the method can be applied to the application scenario as shown in FIG. 1. As shown in FIG. 2, the method for transmitting image data includes the following steps.

In step 101, a transmission component for image data acquires initial image data of a to-be-displayed image in a display panel.

The display panel includes a plurality of pixels, and the initial image data includes pixel data of the plurality of pixels. The pixel data of each pixel refers to a color value of the pixel. For example, the color values may include RGB color values. Optionally, the transmission component for image data may be a processor in a display apparatus or may be a controller in the display apparatus.

In step 102, the transmission component for image data compresses pixel data of a plurality of first pixels in the initial image data to acquire at least one piece of compressed pixel data.

In the embodiment of the present disclosure, a display region of the display panel may be divided into a foveal region and a non-foveal region. The foveal region may refer to a region where a viewer watches, and the non-foveal region refers to a region other than the foveal region in the display region. The plurality of first pixels are disposed in the non-foveal region, and a plurality of second pixels other than the plurality of first pixels are disposed in the foveal region.

Since the non-foveal region is not a region where the viewer focuses on watching, the transmission component for image data may compress the pixel data of the plurality of first pixels in the non-foveal region to acquire at least one piece of compressed pixel data. Compressing the pixel data of the plurality of first pixels may refer to deleting pixel data of at least one first pixel. Each compressed pixel data acquired by the transmission component for image data may be pixel data of a certain first pixel, or may be a mean value or median value of the pixel data of at least two first pixels. By compressing the pixel data of the plurality of first pixels, it can be ensured that the acquired at least one piece of compressed pixel data has a relatively small data volume.

Optionally, in the embodiment of the present disclosure, the transmission component may determine the foveal region based on the data acquired by a foveal region detection sensor, and then determine the non-foveal region. Alternatively, the foveal region may be a preset fixed region, and a position of the fixed foveal region may be pre-stored in the transmission component.

In step 103, the transmission component for image data sends compressed image data to a driver chip of the display panel.

The compressed image data includes the at least one piece of compressed pixel data compressed by the transmission component, and uncompressed pixel data of the plurality of second pixels in the foveal region. The compressed image data is configured for driving the display panel to display by the driver chip.

It can be understood that in the case that the transmission component for image data is a processor, the processor may send the compressed image data to the controller, and then the controller sends the compressed image data to the driver chip. In the case that the transmission component for image data is a controller, the controller may directly send the compressed image data to the driver chip.

In step 104, the driver chip drives pixels in the display panel by the compressed image data.

Upon receiving the compressed image data, the driver chip may drive the plurality of first pixels in the display panel by the compressed pixel data in the compressed image data, and may drive the second pixels in the display panel by the pixel data of the second pixels in the compressed image data, thereby realizing the display of the image.

In summary, the method for transmitting image data is provided in the embodiment of the present disclosure. The transmission component can compress the pixel data of the non-foveal region in the initial image data, and send the compressed image data acquired by compression to the driver chip. Since the data volume of the compressed image data is relatively small, the data volume of the image data to be transmitted by the transmission component can be effectively reduced on the premise of avoiding the impact on a display effect, thereby reducing a bandwidth occupied in a transmission process of the image data.

In addition, since the data volume of the image data to be transmitted by the transmission component is relatively low, a power consumption of the display apparatus can also be reduced. Further, the requirements on a data transmission bandwidth between the transmission component and the driver chip in the display apparatus are relatively low, to avoid an increase in the cost of the display apparatus.

Figure 3:
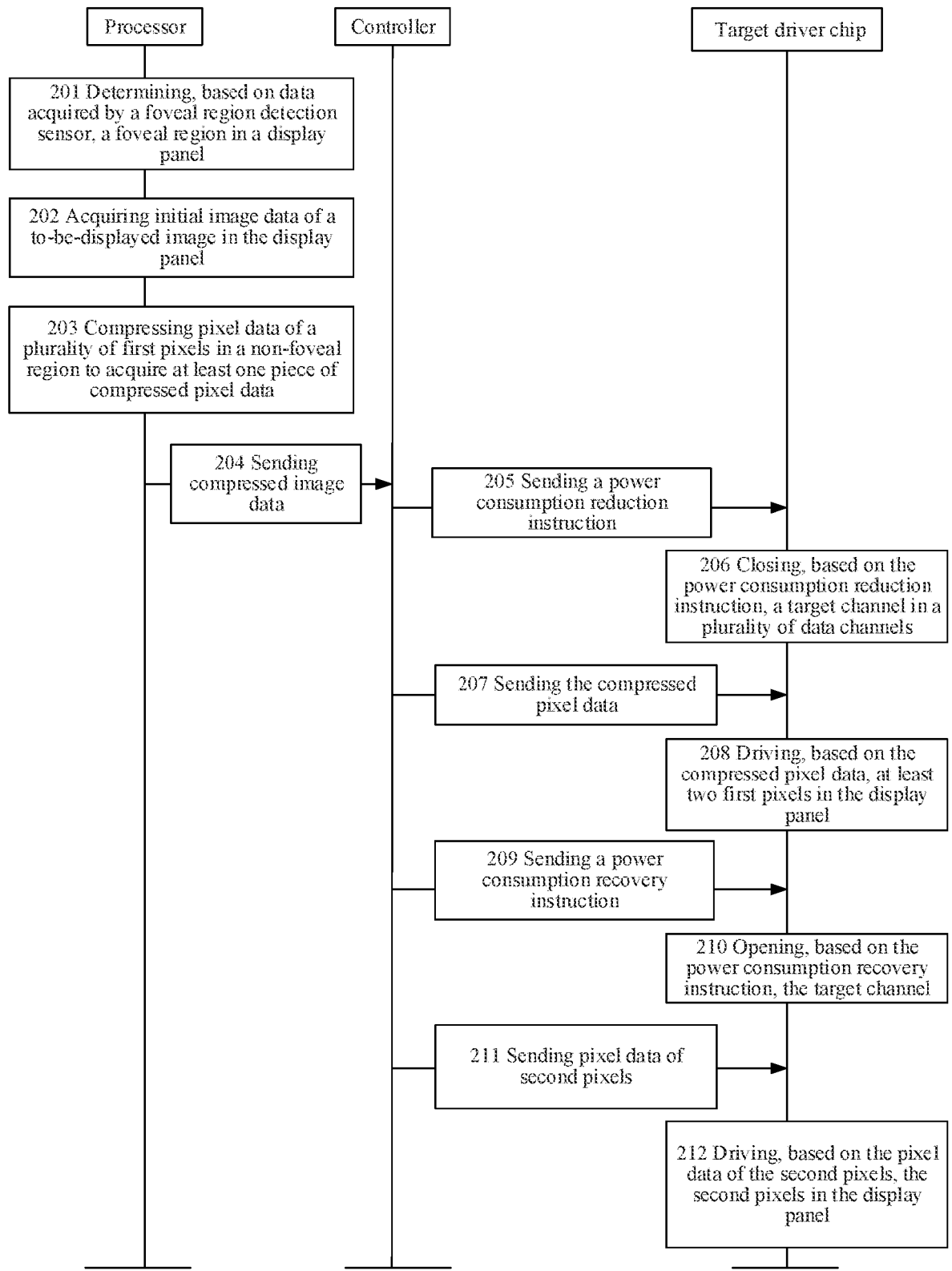
FIG. 3 is a flowchart of another method for transmitting image data according to an embodiment of the present disclosure.

FIG. 3 is a flowchart of another method for transmitting image data according to an embodiment of the present disclosure. The method can be applied to the application scenario as shown in FIG. 1, and the method is described by taking the processor as an example of a transmission component for image data. As shown in FIG. 3, the method for transmitting image data includes the following steps.

In step 201, the processor determines a foveal region in a display panel based on data acquired by a foveal region detection sensor.

In the embodiment of the present disclosure, the foveal region detection sensor may be disposed on the display panel, and the processor may acquire the data acquired by the foveal region detection sensor in real-time, and determine the foveal region where a viewer's line of sight is fixed in the display panel based on the acquired data.

Optionally, the foveal region detection sensor may include a camera, and the processor may determine the size of a face of the viewer based on the image data acquired by the camera, and then determine a relative position of the viewer to the display panel. The relative position at least may include a distance. Then, the processor may acquire the foveal region of the display panel by calculation based on the relative position. As the relative position of the viewer to the display panel changes, the foveal region also changes. Accordingly, the processor may determine the changed foveal region based on the changed relative position. For example, in the case that the distance between the viewer and the display panel becomes farther, with the same optimal visual angle of 30°, the area where the line of sight of the viewer is projected in the display panel becomes larger, and the foveal region in the display panel also increases accordingly.

Alternatively, in addition to the camera, the foveal region detection sensor may also include an infrared emitter. The infrared emitter may emit infrared light to the eyes of the viewer, and the camera may acquire an eye image of the viewer and transmit the eye image to the processor. The processor may determine the pupil positions of the viewer based on the eye image, and then determine the foveal region of the viewer based on the pupil positions. Since the direction of the line of sight of the viewer may change in the process that the display panel displays an image, dynamic tracking for the foveal region of the viewer can be achieved by the data acquired by the foveal region detection sensor. Furthermore, it can be ensured that after pixel data of a non-foveal region is compressed, a viewing experience of the viewer is not affected.

In step 202, the processor acquires initial image data of a to-be-displayed image in the display panel.

The initial image data includes pixel data of a plurality of pixels in the display panel. The pixel data of each pixel refers to a color value of the pixel. For example, the color values may include RGB color values.

In step 203, the processor compresses pixel data of a plurality of first pixels in the non-foveal region to acquire at least one piece of compressed pixel data.

The non-foveal region refers to a region in the display panel other than the foveal region. The plurality of first pixels are disposed in the non-foveal region, and a plurality of second pixels other than the plurality of first pixels in the plurality of pixels of the display panel are disposed in the foveal region.

Since the non-foveal region is not a region where the viewer focuses on watching, the processor may compress the pixel data of the plurality of first pixels in the non-foveal region to acquire at least one piece of compressed pixel data. Compressing the pixel data of the plurality of first pixels may refer to: deleting pixel data of at least one first pixel. Each compressed pixel data acquired by the processor may be pixel data of a certain first pixel, or may be a mean value or median value of the pixel data of at least two first pixels. By compressing the pixel data of the plurality of first pixels, it can be ensured that the acquired at least one piece of compressed pixel data has a relatively small data volume.

Figure 4:
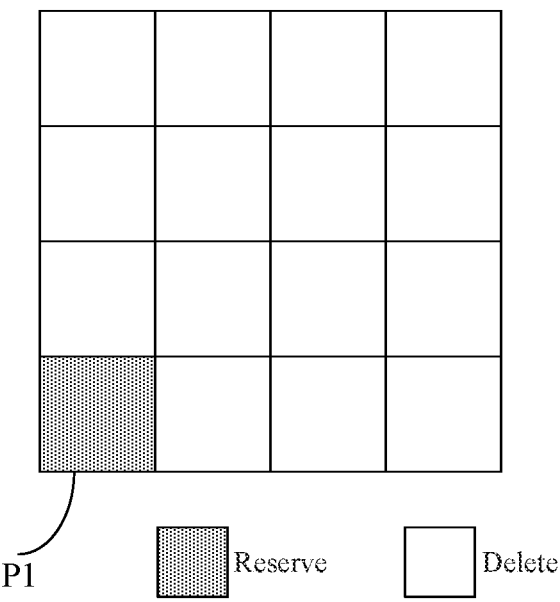
FIG. 4 is a schematic diagram of a non-foveal region according to an embodiment of the present disclosure.

Exemplarily, FIG. 4 is a schematic diagram of a non-foveal region according to an embodiment of the present disclosure. Referring to FIG. 4, assuming that the non-foveal region includes 4 rows and 4 columns of first pixels (i.e., 16 first pixels) P1, then the processor may delete the pixel data of 15 first pixels P1, and only reserve the pixel data of one first pixel as one piece of compressed pixel data. For example, in FIG. 4, the processor may use the pixel data of the first pixel in the fourth row and the first column as one piece of compressed pixel data.

Figure 5:
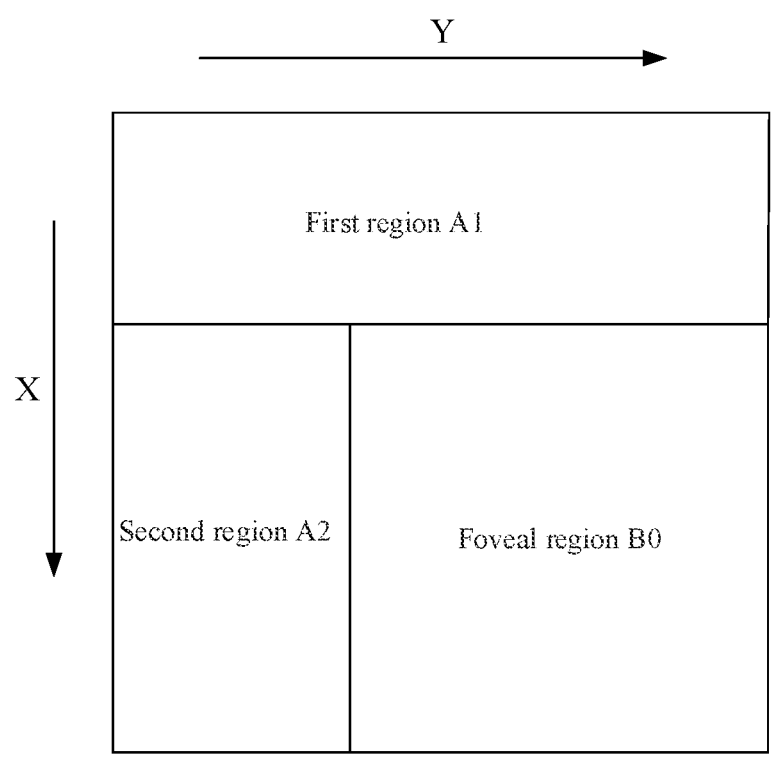
FIG. 5 is a schematic diagram of a display region of a display panel according to an embodiment of the present disclosure.
Figure 6:
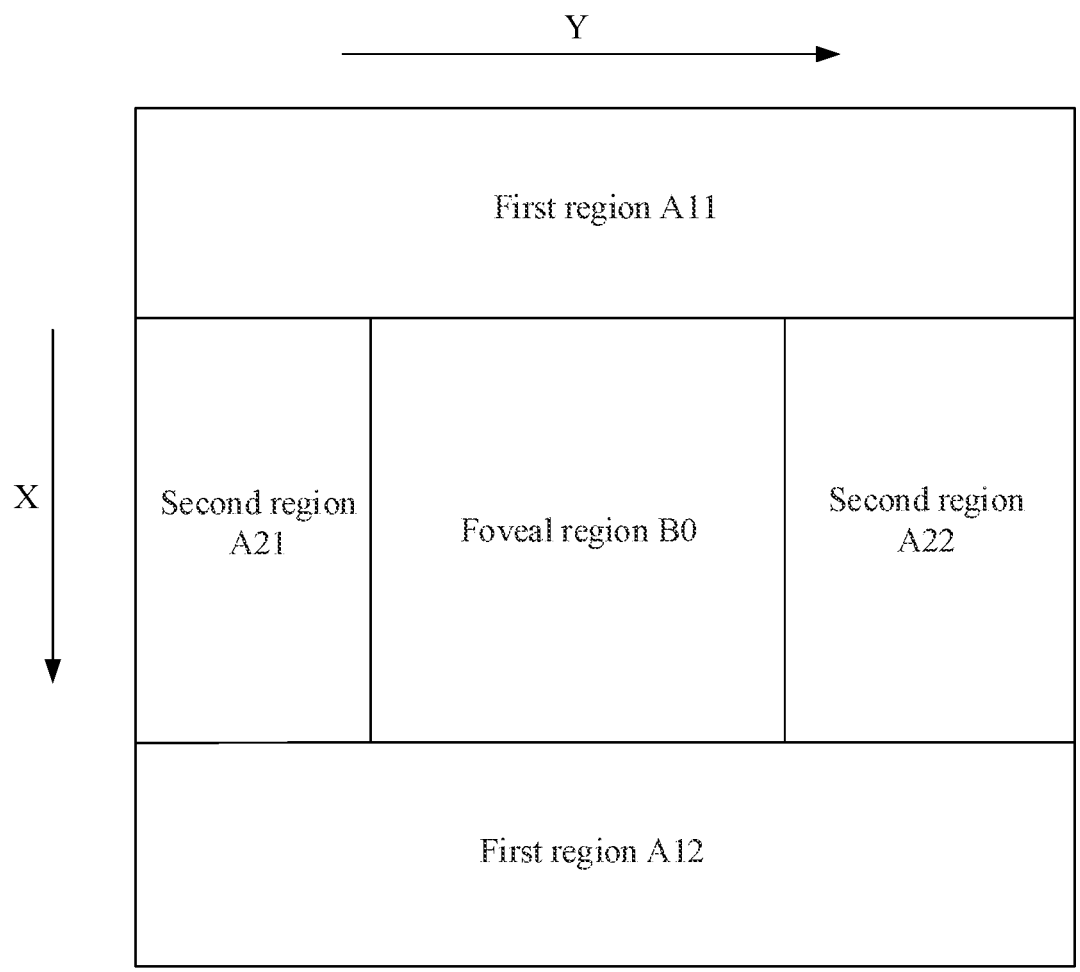
FIG. 6 is a schematic diagram of another display region of a display panel according to an embodiment of the present disclosure.

In the embodiment of the present disclosure, as shown in FIG. 5, the non-foveal region may include at least one of a first region A1 and a second region A2. The first region A1 refers to a region arranged with the foveal region B0 in a pixel column direction X, and the second region A2 refers to a region arranged with the foveal region B0 in a pixel row direction Y. It can be understood that the non-foveal region may include one or more first regions A1 and may include one or more second regions A2. For example, as shown in FIG. 6, the non-foveal region may include a first region A11 and a first region A12 and may include a second region A21 and a second region A22.

For a scenario where the non-foveal region includes the first region A1, the processor may compress pixel data of N rows and M columns of first pixels in the first region A1 to acquire one piece of compressed pixel data, wherein both N and M may be integers greater than 1. Each compressed pixel data may be pixel data of a certain first pixel in the N rows and M columns of first pixels, or may be a mean value or median value of the pixel data of the N rows and M columns of first pixels.

Assuming that the pixel row direction Y is referred to as a transversal direction, and the pixel column direction X is referred to as a longitudinal direction, then the processor may respectively perform transversal compression and longitudinal compression on the pixel data of the plurality of first pixels in the first region A1. In addition, a transversal compression ratio is 1/M, a longitudinal compression ratio is 1/N, and an overall compression ratio is 1/(M×N). That is, the data volume of at least one piece of compressed pixel data acquired after the processor compresses the pixel data of the plurality of first pixels in the first region A1 is 1/(M×N) of an original data volume.

Figure 7:
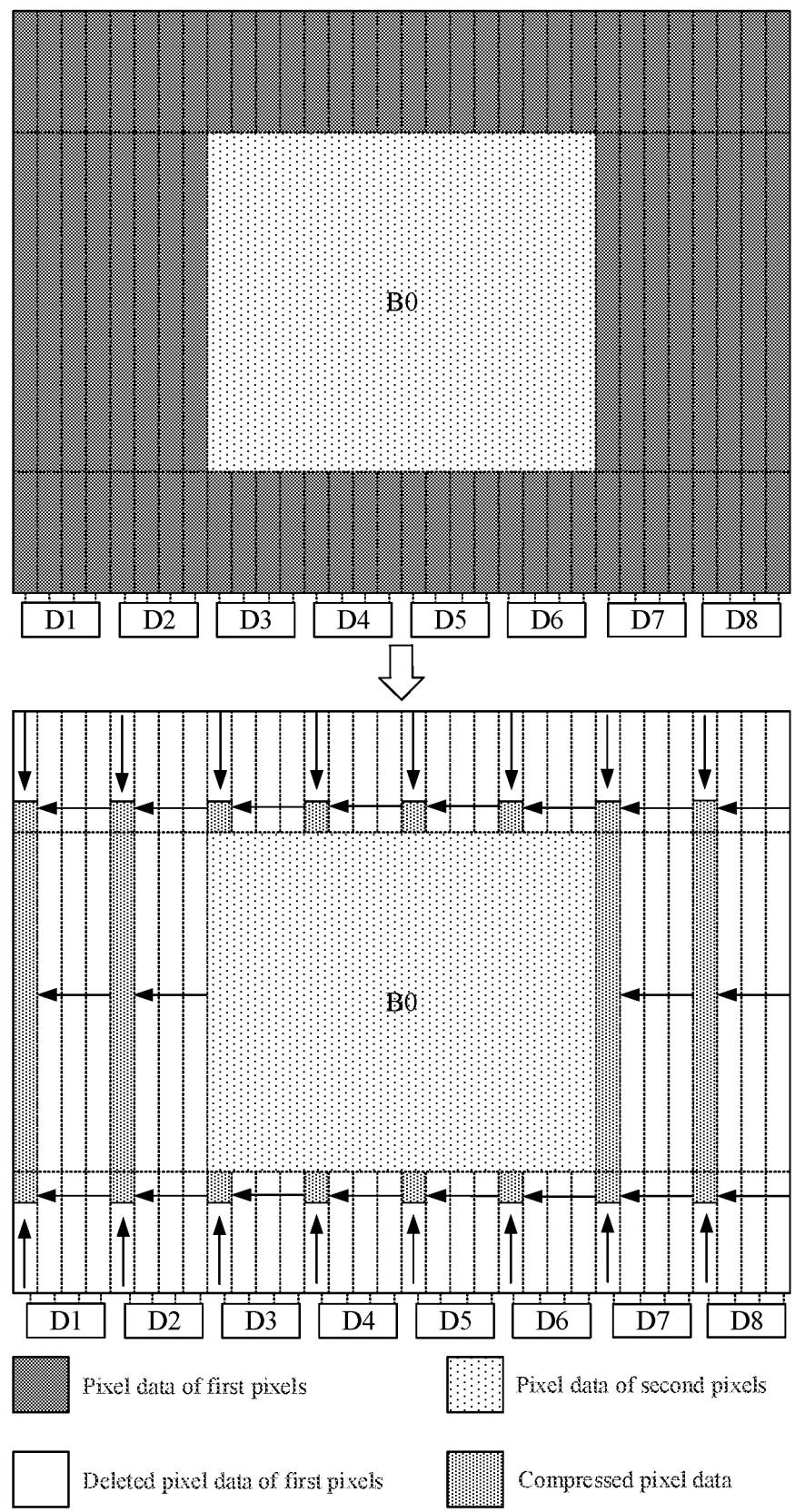
FIG. 7 is a schematic diagram of compressing pixel data in a non-foveal region by a processor according to an embodiment of the present disclosure.

Referring to FIG. 7, the display apparatus may include a plurality of driver chips, for example, a total of 8 driver chips D1 to D8 are shown in FIG. 7. Each driver chip may be connected to a plurality of columns of pixels in the display panel. In response to compressing the pixel data of the first pixels in the first region A1, the processor may compress pixel data of the plurality of columns of first pixels connected to the same driver chip.

Optionally, each driver chip may include a plurality of data channels, each data channel is connected to a plurality of columns of pixels, and the pixels connected to different data channels are disposed in different columns. In the case that the plurality of columns of pixels connected to a target driver chip in the plurality of driver chips include the first pixels disposed in the first region A1, M may be equal to the number of data channels included in the target driver chip. Correspondingly, after the processor compresses the pixel data of the first pixels connected to the target driver chip, only part or all of pixel data of one data channel may be reserved, and other pixel data of the data channel and pixel data of other M−1 data channels (that is, target channels) are both deleted. The reserved pixel data of the data channel (that is, the compressed pixel data) may be pixel data of the first pixels connected to the data channel, or may be a mean value or median value of the pixel data of the first pixels connected to M data channels.

Assuming that a certain first region A1 includes K rows of first pixels, the target driver chip is provided with M data channels, and each data channel is connected to J columns of first pixels in the first region A1, that is, the target driver chip is connected to K×M×J first pixels in the first region A1, wherein K is an integer multiple of N, and J is an integer greater than 1. Then, after the processor compresses pixel data of every N rows and M columns of first pixels in the first region A1, (K/N)×J pieces of compressed pixel data may be acquired, and the (K/N)×J pieces of compressed pixel data may be arranged in an array of K/N rows and J columns.

Exemplarily, referring to FIG. 7, assuming that the target driver chip is driver chip D1, and the target driver chip D1 includes 4 data channels, then M may be equal to 4. Assuming that N is also equal to 4, then as shown in FIG. 7, the processor may perform transversal compression and longitudinal compression on the pixel data of the plurality of first pixels connected to the target driver chip D1, and the data volume of the compressed pixel data acquired after compression is 1/16 of the original data volume.

Referring to FIG. 7, it can be seen that the compressed pixel data acquired after the compression is 1/4 of the pixel data of the first pixels connected to a first data channel of the target driver chip D1, and 3/4 of the pixel data of the first pixels connected to the first data channel and the pixel data of the first pixels connected to the other three data channels are both deleted.

For a scenario where the non-foveal region includes the second region A2, the processor may compress pixel data of M columns of first pixels in the second region A2 to acquire one piece of compressed pixel data, wherein M may be an integer greater than 1.

The foveal region is a region that the viewer focuses on watching. To not affect a display effect of the foveal region, the processor does not compress the pixel data of the plurality of second pixels in the foveal region. Since the processor does not compress the pixel data of the foveal region, in the case that the processor performs longitudinal compression on the pixel data of the first pixels in the second region A2, a complete rectangular image may not be displayed based on finally acquired compressed image data. Therefore, in the embodiment of the present disclosure, the processor may only perform transversal compression on the pixel data of the first pixels in the second region A2. Besides, the transversal compression ratio may be I/M.

It can be understood that, for a scenario where the display apparatus includes a plurality of driver chips, in the case that the processor compresses the pixel data of the first pixels in the second region A2, the pixel data of a plurality of columns of first pixels connected to the same driver chip may be compressed. Besides, M may be equal to the number of data channels included in the driver chip.

Assuming that the target driver chip is provided with M data channels, each data channel is connected to J columns of first pixels in the second region A2, and J is an integer greater than 1. Then, for each row of first pixels connected to the target driver chip in the second region A2, the processor may compress pixel data of every M first pixels to acquire one piece of compressed pixel data, and finally may acquire J pieces of compressed pixel data in the same row. The j compressed pixel data may be pixel data of the $j^{th}$ column of first pixels in any data channel. Alternatively, in the case that the j compressed pixel data is calculated, the pixel data of the $j^{th}$ column of first pixels of each data channel in the M data channels may be acquired, and the mean value or median value of the acquired pixel data of M first pixels is taken as the $j^{th}$ compressed pixel data, wherein j is a positive integer not greater than J.

Exemplarily, referring to FIG. 7, assuming that the target driver chip is driver chip D2, and the target driver chip D2 includes 4 data channels, then M may be equal to 4. Correspondingly, as shown in FIG. 7, after the processor compresses pixel data of the first pixels connected to the target driver chip D2, only pixel data corresponding to one data channel may be reserved, and pixel data corresponding to the other three target channels are all deleted. That is, the transversal compression ratio is ¼, and the longitudinal compression is not performed. Correspondingly, the data volume of the compressed pixel data acquired after compression is ¼ of the original data volume.

In step 204, the processor sends compressed image data to a controller.

After the processor compresses the pixel data of the first pixels of the non-foveal region, the compressed image data may be acquired, and the compressed image data is sent to the controller. The compressed image data includes at least one piece of compressed pixel data acquired by compression, and uncompressed pixel data of the plurality of second pixels in the foveal region. The compressed image data is configured to be transmitted to the driver chip by the controller, such that the driver chip drives the display panel for display.

Since the compressed image data transmitted by the processor is acquired by compressing the pixel data of the first pixels of the non-foveal region, the data volume of the compressed image data is relatively small. Furthermore, it can be ensured that the processor occupies less bandwidth when sending the compressed image data to the controller, and a transmission efficiency of the image data is relatively high.

Figures 8, 9, 10:
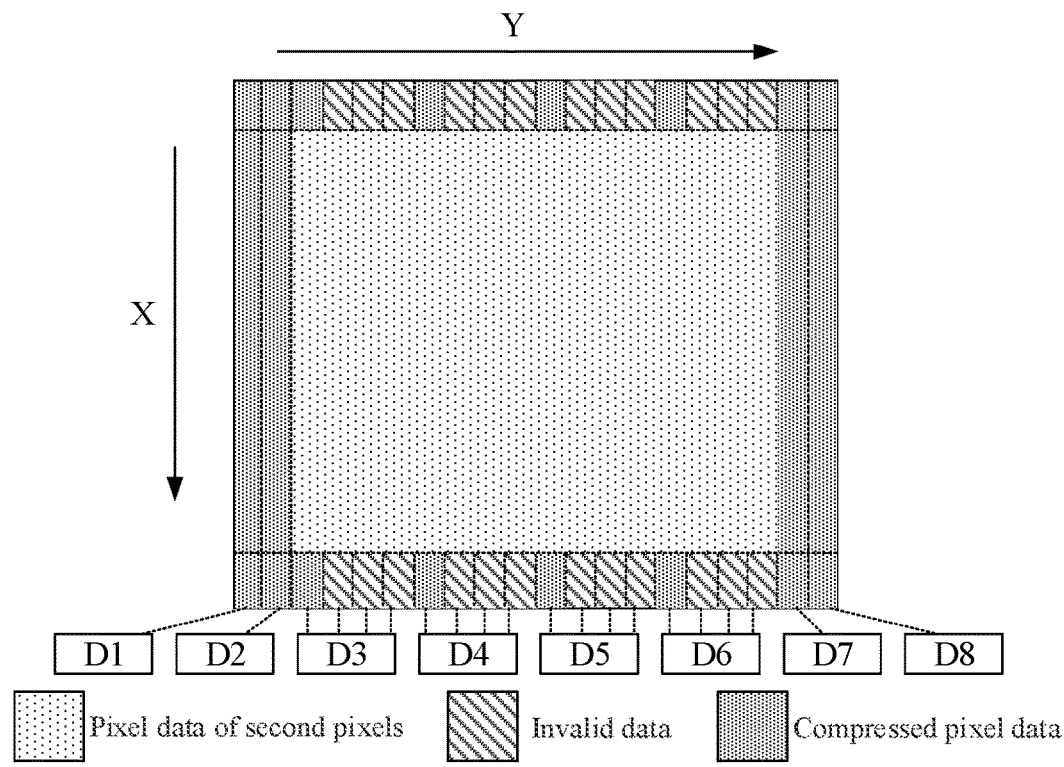
FIG. 8 is a schematic diagram of compressed image data according to an embodiment of the present disclosure.
FIG. 9 is a schematic diagram of a row of invalid display data sent by a controller according to an embodiment of the present disclosure.
FIG. 10 is a schematic diagram of a row of display data sent by a controller according to an embodiment of the present disclosure.

Exemplarily, the compressed image data sent by the processor to the controller may be as shown in FIG. 8. Referring to FIG. 8, the compressed image data includes the compressed pixel data and the pixel data of the plurality of second pixels.

Optionally, with reference to FIG. 7, in the case that part of the first pixels in the first region A1 and the second pixels of the foveal region B0 are in the same columns, and the processor has performed transversal compression on the pixel data of the part of first pixels, then, as shown in FIG. 8, the compressed image data acquired by the processor may also include invalid pixel data. The invalid pixel data and the pixel data of the second pixels are arranged in the pixel column direction X, and the invalid pixel data and the compressed pixel data in the first region A1 are arranged in the pixel row direction Y. Therefore, it can be ensured that the image corresponding to the compressed image data is a complete rectangular image. The invalid pixel data filled in the compressed image data by the processor may all be 0.

In step 205, the controller sends a power consumption reduction instruction to the target driver chip.

In the embodiment of the present disclosure, upon receiving the compressed image data sent by the processor, the controller may transmit the compressed image data to at least one driver chip connected to the display panel. In addition, the controller may also transmit the compressed pixel data in the compressed image data and the pixel data of the second pixels to the corresponding driver chip based on a compression rule of the compressed image data and a connection relationship between respective driver chips and respective columns of pixels in the display panel. The pixel data received by each driver chip is the pixel data of the connected pixels.

It can be understood that the controller may transmit the pixel data row by row. Assuming that the display panel is connected to T driver chips, T being an integer greater than 1, then the controller may divide each row of pixel data in the compressed image data into T groups of pixel data in one-to-one correspondence with the T driver chips, and respectively transmit the T groups of pixel data to the corresponding driver chips. In the case that the driver chip includes M opened data channels, the controller may divide one group of pixel data corresponding to the driver chip into M parts, and respectively transmit M parts of pixel data to the corresponding data channels.

It can also be understood that in the case that a certain row of pixel data in the compressed image data includes both the compressed pixel data and the uncompressed pixel data of the second pixels, the controller may transmit the compressed pixel data and the pixel data of the second pixels in parallel.

To reduce a power consumption of the target driver chip connected to the first pixels in the non-foveal region, prior to sending the compressed pixel data to the target driver chip, the controller may firstly send the power consumption reduction instruction to the target driver chip. The power consumption reduction instruction is configured to instruct the target driver chip to close a target channel, wherein the target channel is a data channel for receiving the compressed pixel data (that is, the deleted pixel data).

Optionally, the controller may carry the power consumption reduction instruction in a configuration instruction CTRL_L sent to the target driver chip. In addition, the power consumption reduction instruction may also carry an identifier of the target channel, and the target driver chip receives the power consumption reduction instruction and may close the target channel instructed by the identifier.

As a possible example, the first region A1 and the foveal region B0 may be arranged in sequence in a driving direction of the pixel row (that is, the pixel column direction X), that is, in the case that the target driver chip drives the pixels in the display region, the first pixels in the region A1 are driven firstly and then the second pixels in the foveal region B0 are driven. In this example, prior to sending the first row of pixel data in the compressed image data, the controller may send a row of invalid display data to the target driver chip. Referring to FIG. 9, the row of invalid display data may include a start indicator K1, a configuration instruction CTRL_L, invalid pixel data and an end indicator K2 which are arranged in sequence. The configuration instruction CTRL_L is configured to carry the power consumption reduction instruction. In addition, as shown in FIG. 9, the row of invalid display data may further include an idle (IDLE) region disposed after the end indicator K2.

As another possible example, the foveal region B0 and the first region A1 may be arranged in sequence in the driving direction of the pixel row (that is, the pixel column direction X), that is, in the case that the target driver chip drives the pixels in the display region, the second pixels in the foveal region B0 are driven firstly, and then the first pixels in the first region A1 are driven. In this example, the controller may carry the power consumption reduction instruction in response to sending the pixel data of the last row of second pixels in the foveal region B0 to the target driver chip. Referring to FIG. 10, the controller may send a row of display data to the target driver chip, and the row of display data may include a start indicator K1, a configuration instruction CTRL_L, the pixel data of the last row of second pixels, and an end indicator K2 which are arranged in sequence. The configuration instruction CTRL_L is configured to carry the power consumption reduction instruction.

In step 206, the target driver chip closes the target channel in the plurality of data channels based on the power consumption reduction instruction.

Upon receiving the power consumption reduction instruction sent by the controller, the target driver chip may close the target channel in the plurality of data channels based on the power consumption reduction instruction, that is, the target driver chip may enter a low power consumption mode. The target channel is a channel for receiving the compressed pixel data (that is, the deleted pixel data). For example, the target driver chip may determine the target channel to be closed based on the identifier of the target channel carried in the power consumption reduction instruction. Since the target driver chip can close the target channel that does not need to receive the pixel data based on the instruction of the controller, the power consumption of the target driver chip can be effectively reduced on the premise of ensuring reliable transmission of the pixel data.

Exemplarily, as shown in FIG. 11 and FIG. 12, assuming that the target driver chip is D3, then prior to sending the first row of compressed pixel data, the controller may firstly send the power consumption reduction instruction to the target driver chip, and the power consumption reduction instruction may carry identifiers of the second data channel R2 to the fourth data channel R4. Upon receiving the power consumption reduction instruction, the target driver chip D3 may close all of the second data channel R2 to the fourth data channel R4, and only keep the first data channel R1 in an on state.

It can be understood that the controller may send the pixel data to the data channel of the driver chip through a transmitting (TX) interface thereof. The data channel of the driver chip may also be called a receiving (RX) interface. Moreover, for a scenario where the driver chip includes a plurality of data channels, the controller may include a plurality of TX interfaces in one-to-one correspondence with the plurality of data channels.

It can be also understood that, prior to sending the compressed pixel data to the target driver chip, the controller may also shut down the TX interface corresponding to the target channel of the target driver chip. In this way, the power consumption of the controller can be effectively reduced, thereby further reducing the overall power consumption of the display apparatus.

Exemplarily, referring to FIG. 12, in the case that the target driver chip D3 includes a total of 4 data channels R1 to R4, then the controller may at least include 4 TX interfaces to be connected to the target driver chip D3, and the 4 TX interfaces are interfaces T1 to T4 respectively. Upon receiving the power consumption reduction instruction, the target driver chip D3 may close all of the second data channel R2 to the fourth data channel R4, and only keep the first data channel R1 in an on state. In addition, the controller may shut down all the interfaces T2 to T4 corresponding to the second data channel R2 to the fourth data channel R4, and only keep the T1 interface in an on state.

In step 207, the controller sends the compressed pixel data to the target driver chip.

Upon instructing the target driver chip to close the target channel, the controller may send the compressed pixel data to the target driver chip. That is, the controller may send the compressed pixel data to the data channel keeping an on state in the target driver chip. The compressed pixel data is acquired by compressing the pixel data of the plurality of first pixels connected to the target driver chip. Since the data volume of the compressed pixel data is relatively small, it can be ensured that the controller occupies less bandwidth in response to sending the compressed pixel data to the target driver chip.

Exemplarily, as shown in FIG. 11 and FIG. 12, assuming that the target driver chip is D3, then the controller may send the compressed pixel data to the first data channel R1 of the target driver chip D3, wherein the compressed pixel data is acquired by compressing the pixel data of the four data channels R1 to R4 connected to the target driver chip D3.

In step 208, the target driver chip drives at least two first pixels in the display panel based on the compressed pixel data.

Upon receiving the compressed pixel data sent by the controller, the target driver chip may drive at least two first pixels in the display panel by the compressed pixel data.

It can be understood that the controller may also send the compression rule of the compressed image data to the target driver chip, and the target driver chip may drive at least two connected first pixels based on the compression rule and the received compressed pixel data.

As a possible example, in the case that one piece of compressed pixel data received by the target driver chip is acquired by compressing the pixel data of N rows and M columns of first pixels in the first region A1, and the target driver chip is connected to K rows and M×J columns of first pixels in the first region A1, then the target driver chip may receive (K/N)−J pieces of compressed pixel data. The target driver chip may duplicate the received (K/N)×J pieces of compressed pixel data by M−1 copies transversely and N−1 copies longitudinally, to acquire K×M×J pieces of compressed pixel data. The target driver chip then may drive the K rows and M×J columns of connected first pixels based on the K×M×J pieces of compressed pixel data.

As another possible example, in the case that one piece of compressed pixel data received by the target driver chip is acquired by compressing the pixel data of M columns of first pixels in the second region A2, and the target driver chip is connected to K rows and M×J columns of first pixels in the second region A2, then the target driver chip may receive K×J pieces of compressed pixel data. The target driver chip may duplicate the received K×J pieces of compressed pixel data transversely by M−1 copies, to acquire K×M−J pieces of compressed pixel data. The target driver chip then may drive the K rows and M×J columns of connected first pixels based on the K×M×J pieces of compressed pixel data.

It can also be understood that the operation of duplicating the compressed pixel data described above may also be understood as decompressing the compressed pixel data.

It can also be understood that the driver chip and the display panel may be connected by a chip on film (COF) technology or bonding. Therefore, there is no strict restriction on the data transmission bandwidth between the driver chip and the display panel, and the driver chip can directly drive the display panel for display after decompressing the received compressed pixel data.

In step 209, the controller sends a power consumption recovery instruction to the target driver chip.

In the embodiment of the present disclosure, in the case that the pixels connected to the target driver chip include the first pixels and second pixels, and the first pixels and the second pixels are arranged in sequence in the driving direction of the pixel row, then the controller also needs to send the pixel data of the second pixels to the target driver chip. Since the pixel data of the second pixels is not compressed, the target driver chip also needs to receive the pixel data of the second pixels through the target channel thereof. Correspondingly, prior to sending the pixel data of the second pixels, the controller also needs to send the power consumption recovery instruction to the target driver chip to instruct the target driver chip to open the target channel.

Exemplarily, as shown in FIG. 11, the pixels connected to the driver chip D3 include both the first pixels disposed in the first region A1 and the second pixels disposed in the foveal region B0, and the first pixels and the second pixels are arranged in sequence in the driving direction of the pixel row. Therefore, prior to sending the pixel data of the second pixels, the controller needs to send the power consumption recovery instruction to the driver chip D3, the power consumption recovery instruction being configured to instruct the driver chip D3 to open the closed three target channels R2 to R4.

It can be understood that the target driver chip needs a certain time to open the target channel thereof, that is, the moment when the target driver chip opens the target channel thereof, which has a certain delay relative to the moment when the controller sends the power consumption recovery instruction. Therefore, the controller needs to send the power consumption recovery instruction m advance to ensure that the target driver chip has opened the target channel thereof in response to the controller sending the pixel data of the second pixels, thereby ensuring reliable receiving of the pixel data of the second pixels.

An interval duration between sending the power consumption recovery instruction to the target driver chip and sending the pixel data of the second pixels by the controller may be greater than or equal to a duration threshold. The duration threshold may be determined based on an open duration required for the target driver chip to open the data channel thereof, and the open duration is related to hardware parameters of the target driver chip.

Exemplarily, assuming that the open duration is equal to the duration required for the controller to transmit N rows of pixel data, and the interval duration is equal to the open duration, then the controller may send the power consumption recovery instruction to the target driver chip in response to sending the compressed pixel data of the $(N+1)^{th}$ row of first pixels from the bottom disposed in front of the first row of second pixels. Upon sending the power consumption recovery instruction, the controller may sequentially transmit the compressed pixel data of the last N rows of first pixels in the first region, and then transmit the pixel data of the first row of second pixels in the foveal region. In this way, it can be ensured that in response to the controller sending the pixel data of the first row of second pixels, the target driver chip has opened the target channel thereof.

Optionally, as shown in FIG. 13, the power consumption recovery instruction sent by the controller to the target driver chip may include a clock training pattern and a link stable pattern (LSP).

Exemplarily, referring to FIG. 13, the controller may send a row of display data to the target chip, and the row of display data may include a clock training pattern, an LSP, a start indicator K1, a configuration instruction CTRL_L, the compressed pixel data of the $(N+1)^{th}$ row of first pixels from the bottom disposed in front of the first row of second pixels and an end indicator K2 which are arranged in sequence.

In step 210, the driver chip opens the target channel based on the power consumption recovery instruction.

Upon receiving the power consumption recovery instruction sent by the controller, the target driver chip may open the closed target channel in the target driver chip based on the power consumption recovery instruction, to ensure reliable transmission of the uncompressed pixel data of the second pixels. For example, the power consumption recovery instruction may carry the identifier of the target channel to be opened, and the target driver chip may open the corresponding target channel based on the identifier carried in the power consumption recovery instruction.

Exemplarily, as shown in FIG. 12, assuming that the target driver chip is D3, and the power consumption recovery instruction sent by the controller to the target driver chip D3 carries the identifiers of the second data channel R2 to the fourth data channel R4. Then, the target driver chip D3 may open the second data channel R2 to the fourth data channel R4 based on the identifiers in the power consumption recovery instruction.

In step 211, the controller sends the pixel data of the second pixels to the target driver chip.

Upon completing the transmission of the compressed pixel data in the first region, the controller may send the pixel data of the second pixels disposed in the foveal region B0 to the target driver chip.

It can be understood that, since the pixel data of the second pixels in the foveal region B0 is not compressed, in the case that the controller shuts down part of TX interfaces n response to sending the compressed pixel data to the target driver chip, the controller needs to open the closed TX interfaces before sending the pixel data of the second pixels, to ensure reliable transmission of the uncompressed pixel data of the second pixels.

Exemplarily, as shown in FIG. 12, assuming that the controller shuts down the interfaces T2 to T4 in response to sending the compressed pixel data to the target driver chip D3, the controller needs to open the interfaces T2 to T4 before sending the pixel data of the second pixels, thereby ensuring reliable transmission of the uncompressed pixel data of the second pixels connected to the target driver chip D3.

It can be understood that, in the process of sending the pixel data of the second pixels to the target driver chip, the controller may also synchronously send the pixel data of the second pixels to other driver chips, and/or the compressed pixel data.

The following describes a transmission process of the compressed image data by taking FIG. 11 as an example. The transmission process may be divided into three transmission stages, wherein the first transmission stage is configured to transmit the compressed pixel data of the first region A11, the second transmission stage is configured to transmit the compressed pixel data of the second region A21, the uncompressed pixel data of the second pixels of the foveal region B0, and the compressed pixel data of the second region A22, and the third transmission stage is configured to transmit the compressed pixel data of the first region A12.

In the first transmission stage, referring to FIG. 11, prior to sending the first row of compressed pixel data in the first region A11, the controller may firstly send the power consumption reduction instruction to the driver chips D1 to D8, to instruct the driver chips D1 to D8 to each close 3 target channels and only keep one data channel in an on state. Afterwards, the controller may send the compressed pixel data of the first region A11 to the driver chips D1 to D8 row by row. Each row of compressed pixel data may be divided into 8 groups of pixel data, each group of pixel data includes 1 piece of compressed pixel data, and the 1 piece of compressed pixel data may be transmitted to the first data channel R1 of one corresponding driver chip of the driver chips D1 to D8.

The foveal region B0 and the first region A11 are sequentially arranged in the driving direction of the pixel row, and the driver chips D3 to D6 are connected to the second pixels of the foveal region B0. Therefore, in response to sending the $(N+1)^{th}$ row of compressed pixel data from the bottom in the first region A11, the controller may send the power consumption recovery instruction to the driver chips D3 to D6 respectively, to instruct the driver chips D3 to D6 to open the closed 3 target channels. Afterwards, the controller may send the last N rows of compressed pixel data in the first region A11 to the driver chips D1 to D8 row by row. Upon completion of sending the compressed pixel data in the first region A11, that is, completion of executing the first transmission stage, the controller may start to execute the second transmission stage.

Referring to FIG. 11, since the pixels connected to the driver chips D1 and D2, and connected to the driver chips D7 and D8 are all the first pixels, the target channels of the above four driver chips may keep an off state in the second transmission stage. In the second transmission stage, each row of pixel data sent by the controller may be divided into 8 groups of pixel data, wherein the first group of pixel data includes 1 piece of compressed pixel data, and the 1 piece of compressed pixel data may be transmitted to the first data channel R1 of the driver chip D1. The second group of pixel data includes 1 piece of compressed pixel data, and the 1 piece of compressed pixel data may be transmitted to the first data channel R1 of the driver chip D2. The third group of pixel data includes 4 pieces of pixel data of the second pixels, and the 4 pieces of pixel data of the second pixels may be respectively transmitted to the first data channel R1 to the fourth data channel R4 of the driver chip D3. The fourth group of pixel data includes 4 pieces of pixel data of the second pixels, and the 4 pieces of pixel data of the second pixels may be respectively transmitted to the first data channel R1 to the fourth data channel R4 of the driver chip D4. The fifth group of pixel data includes 4 pieces of pixel data of the second pixels, and the 4 pieces of pixel data of the second pixels may be respectively transmitted to the first data channel R1 to the fourth data channel R4 of the driver chip D5. The sixth group of pixel data includes 4 pieces of pixel data of the second pixels, and the 4 pieces of pixel data of the second pixels may be respectively transmitted to the first data channel R1 to the fourth data channel R4 of the driver chip D6. The seventh group of pixel data includes 1 piece of compressed pixel data, and the 1 piece of compressed pixel data may be transmitted to the first data channel R1 of the driver chip D7. The eighth group of pixel data includes 1 piece of compressed pixel data, and the 1 piece of compressed pixel data may be transmitted to the first data channel R1 of the driver chip D8.

In response to sending the pixel data of the last row of second pixels, the controller may send the power consumption reduction instruction to the driver chips D3 to D6 respectively, to instruct the driver chips D3 to D6 to each close 3 target channels and only keep one data channel in an on state. Afterwards, the controller may execute the third transmission stage. Referring to FIG. 11, in the third transfer stage, the controller may send the compressed pixel data of the first region A12 to the driver chips D1 to D8 row by row. Each row of compressed pixel data may be divided into 8 groups of pixel data, each group of pixel data includes 1 piece of compressed pixel data, and the 1 piece of compressed pixel data may be transmitted to the first data channel R1 of one corresponding driver chip of the driver chips D1 to D8.

Based on the above introduction on the three transmission stages, it can be known that each row of pixel data sent by the controller in the first transmission stage and the third transmission stage includes 8 pieces of compressed pixel data, and each row of pixel data sent by the controller in the second transmission stage includes a total of 20 pieces of pixel data.

It can be understood that, as shown in FIG. 11, the pixel data in the first regions A11 and A12 may also include invalid data, and the invalid data corresponds to the target channels in the driver chips. Since the controller has instructed the driver chips to close the target channels before transmitting the pixel data in the first regions A11 and A12, the controller does not need to transmit the invalid data to the driver chips.

In step 212, the target driver chip drives the second pixels in the display panel based on the pixel data of the second pixels.

Upon receiving the pixel data of the second pixels sent by the controller, the target driver chip may drive the second pixels in the display panel based on the pixel data of the second pixels.

It should be understood that the sequence of the steps of the method for transmitting image data according to the embodiment of the present disclosure may be appropriately adjusted, and the steps may be correspondingly increased or decreased according to the situation. For example, step 201 may be deleted according to the situation, that is, the processor may take a pre-stored fixed region as the foveal region. Alternatively, step 211 may be executed before step 207 or may be performed synchronously with step 207. Alternatively, steps 209 and 210 may be deleted according to the situation. For example, in the case that the non-foveal region only includes the second region A2 and does not include the first region A1, then the target channel of the target driver chip may always keep an off state. Various methods easily conceivable by any person skilled in the art within the technical scope of the present disclosure should be covered by the protection scope of the present disclosure, which are not repeated here.

In summary, the method for transmitting image data is provided in the embodiment of the present disclosure. The processor can compress the pixel data of the non-foveal region in the initial image data, and send the compressed image data to the controller. Therefore, on the premise of avoiding the impact on a display effect, the data volume of the image data to be transmitted by the processor can be effectively reduced, thereby reducing the bandwidth occupied in the process of transmitting the image data from the processor to the controller. The data volume of the image data received by the controller is relatively small, such that the data volume of the pixel data transmitted by the controller to the driver chip is correspondingly reduced, and the bandwidth occupied in the process that the controller transmits the image data to the driver chip can also be reduced.

Since the data volume of the image data to be transmitted by the processor and the controller is relatively low, the power consumption of the display apparatus can also be reduced, and the requirements on a data transmission bandwidth between the processor and the controller, as well as between the controller and the driver chip in the display apparatus are relatively low, thereby avoiding an increase in the cost of the display apparatus. The controller can shut down the interfaces that do not need to send the pixel data and can instruct the driver chips to close the target channels that do not need to receive the pixel data, such that the power consumption of the controller and the driver chip can be effectively reduced on the premise of ensuring reliable transmission of the pixel data.

In addition, the processor can also dynamically track the foveal region of the viewer based on the data detected by the foveal region detection sensor, such that dynamic adjustment on the data channels that need to be closed in the driver chips, as well as the dynamic adjustment on the pixel data of the pixels that need to be compressed, can be realized. Therefore, on the premise of effectively reducing the data transmission bandwidth and the power consumption of the display apparatus, high-definition rendering of the foveal region can be ensured, and the requirements of the users on ultra-high-definition and ultra-high-frequency visual experiences of the foveal region can be met.

Figure 14:
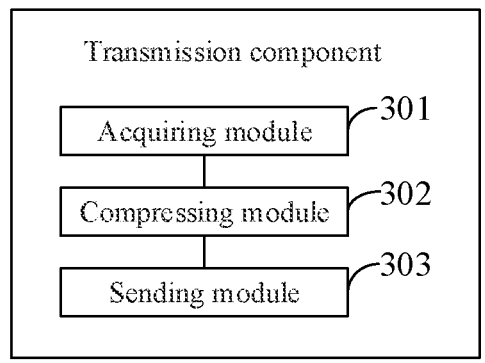
FIG. 14 is a schematic structural diagram of a transmission component for image data according to an embodiment of the present disclosure.

FIG. 14 is a schematic structural diagram of a transmission component for image data according to an embodiment of the present disclosure. The transmission component may be applied to the display apparatus shown in FIG. 1, for example, the image transmission component may be a processor or controller in the display apparatus. Furthermore, the transmission component may be configured to perform the steps executed by the transmission component in the method embodiment as shown in FIG. 2 or may be configured to perform the steps executed by the processor or controller in the method embodiment shown in FIG. 3. As shown in FIG. 14, the transmission component may include:

an acquiring module 301, configured to acquire initial image data of a to-be-displayed image in a display panel, wherein the display panel includes a plurality of pixels, and the initial image data includes pixel data of the plurality of pixels;

a compressing module 302, configured to compress pixel data of a plurality of first pixels in the initial image data to acquire at least one piece of compressed pixel data, wherein the plurality of first pixels are disposed in a non-foveal region of the display panel, and a plurality of second pixels in the plurality of pixels other than the plurality of first pixels are disposed in a foveal region of the display panel; and a sending module 303, configured to send compressed image data to a driver chip of the display panel, wherein the compressed image data includes the at least one piece of compressed pixel data and pixel data of the plurality of second pixels, and the compressed image data is configured for driving the display panel to display by the driver chip.

Optionally, the non-foveal region includes a first region, wherein the first region and the foveal region of the display panel are arranged in a pixel column direction. Correspondingly, the compressing module 302 may be configured to compress pixel data of N rows and M columns of first pixels in the first region to acquire one piece of compressed pixel data, both N and M being integers greater than 1.

Optionally, the non-foveal region includes a second region, wherein the second region and the foveal region are arranged in a pixel row direction. Correspondingly, the compressing module 302 may be configured to compress pixel data of M columns of first pixels disposed in a same row in the second region to acquire one piece of compressed pixel data. M being an integer greater than 1.

Optionally, the M columns of first pixels are connected to a same driver chip.

Figure 15:
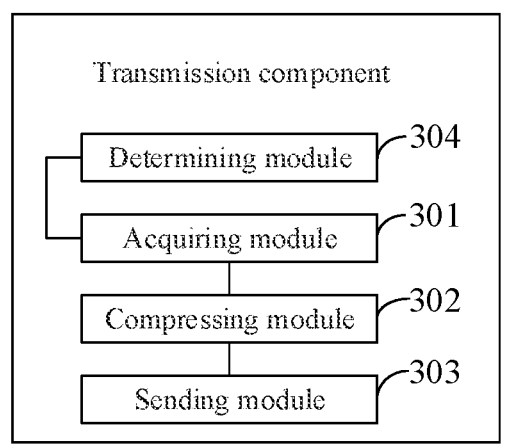
FIG. 15 is a schematic structural diagram of another transmission component for image data according to an embodiment of the present disclosure.

Optionally, as shown in FIG. 15, the transmission component also includes:

a determining module 304 configured to, before the compressing module 302 compresses the pixel data of the plurality of first pixels in the initial image data, determine, based on data acquired by a foveal region detection sensor, the foveal region.

Optionally, the compressing module 302 may be configured to delete pixel data of at least one first pixel in the pixel data of the plurality of first pixels to acquire at least one piece of compressed pixel data;

wherein each compressed pixel data is pixel data of one of the first pixels, or a mean value or median value of the pixel data of at least two first pixels.

Optionally, the transmission component for image data is a processor in the display apparatus, and the display apparatus further includes a controller connected to the driver chip. Correspondingly, the sending module 303 may be configured to send the compressed image data to the controller, wherein the compressed image data is configured to be transmitted to the driver chip by the controller.

Optionally, the transmission component for image data is a controller in the display apparatus, and the controller is connected to at least one driver chip. Correspondingly, the sending module 303 may be configured to:

send a power consumption reduction instruction to a target driver chip, the power consumption reduction instruction being configured to instruct the target driver chip to close a target channel, wherein the target driver chip is a driver chip for driving the first pixels and is provided with a plurality of data channels, and the target channel is a channel for receiving the compressed pixel data; and send the compressed pixel data to the target driver chip, and send the pixel data of the plurality of second pixels to a driver chip for driving the plurality of second pixels in the plurality of driver chips.

Optionally, the non-foveal region includes the first region, wherein the first region and the foveal region of the display panel are arranged in the pixel column direction; pixels connected to the target driver chip include the first pixels and the second pixels, wherein the first pixels and the second pixels are sequentially arranged in a driving direction of a pixel row. Correspondingly, the sending module 303 may be configured to:

send a power consumption recovery instruction to the target driver chip, the power consumption recovery instruction being configured to instruct the target driver chip to open the target channel; and send the pixel data of the second pixels connected to the target driver chip to the target driver chip; wherein an interval duration between sending the power consumption recovery instruction to the target driver chip and sending the pixel data of the second pixels is greater than or equal to a duration threshold.

Optionally, the sending module 303 may be configured to send a clock training pattern and a link stable pattern to the target driver chip.

In summary, the transmission component is provided in the embodiment of the present disclosure, in response to transmitting the pixel data, the transmission component can compress the pixel data of the non-foveal region in the initial image data, and send the compressed image data to the driver chip. Therefore, on the premise of avoiding the impact on a display effect, the data volume of the image data to be transmitted can be effectively reduced, thereby reducing the bandwidth occupied in a transmission process of the image data.

Moreover, since the data volume of the image data to be transmitted by the transmission component is relatively low, the power consumption of the display apparatus can also be reduced, and the requirements on a data transmission bandwidth between the transmission component and the driver chip in the display apparatus are relatively low, to avoid an increase in the cost of the display apparatus.

Figure 16:
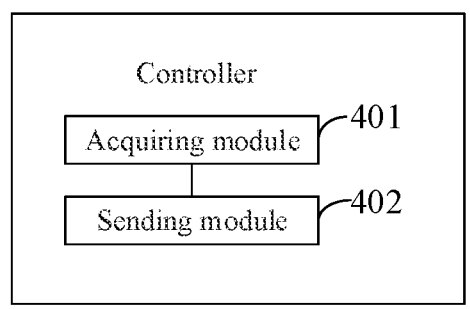
FIG. 16 is a schematic structural diagram of a controller according to an embodiment of the present disclosure.

FIG. 16 is a schematic structural diagram of a controller according to an embodiment of the present disclosure, and the controller is connected to at least one driver chip in a display apparatus. Besides, the controller may be configured to perform the steps executed by the transmission component in the method embodiment as shown in FIG. 2, or may be configured to perform the steps executed by the controller in the method embodiment shown in FIG. 3. As shown in FIG. 15, the controller may include:

an acquiring module 401, configured to acquire compressed image data of a to-be-displayed image in a display panel, wherein the compressed image data includes at least one piece of compressed pixel data and pixel data of a plurality of second pixels, wherein the at least one piece of compressed pixel data is acquired by compressing pixel data of a plurality of first pixels, the plurality of first pixels are disposed in a non-foveal region of the display panel, and the plurality of second pixels are disposed in a foveal region of the display panel; and a sending module 402 configured to send a power consumption reduction instruction to a target driver chip, the power consumption reduction instruction being configured to instruct the target driver chip to close a target channel, wherein the target driver chip is a driver chip for driving the first pixels, the target driver chip is provided with a plurality of data channels, and the target channel is a channel for receiving the compressed pixel data;

wherein the sending module 402 is further configured to send the compressed pixel data to the target driver chip, and send the pixel data of the plurality of second pixels to a driver chip for driving the plurality of second pixels in the at least one driver chip.

Optionally, the non-foveal region includes a first region, wherein the first region and the foveal region of the display panel are arranged in a pixel column direction; the pixels connected to the target driver chip include the first pixels and the second pixels, wherein the first pixels and the second pixels are sequentially arranged in a driving direction of a pixel row. Correspondingly, the sending module 402 may be configured to:

send a power consumption recovery instruction to the target driver chip, the power consumption recovery instruction being configured to instruct the target driver chip to open the target channel; and send the pixel data of the second pixels connected to the target driver chip to the target driver chip; wherein an interval duration between sending the power consumption recovery instruction to the target driver chip and sending the pixel data of the second pixels is greater than or equal to a duration threshold.

In summary, the controller is provided in the embodiment of the present disclosure. The controller can acquire the compressed image data and send the compressed image data to the driver chip. Since the data volume of the image data to be transmitted by the controller is relatively low, the power consumption of the display apparatus can also be reduced, and the requirements on the data transmission bandwidth between the controller and the driver chip in the display apparatus are relatively low, thereby avoiding an increase in the cost of the display apparatus.

Figure 17:
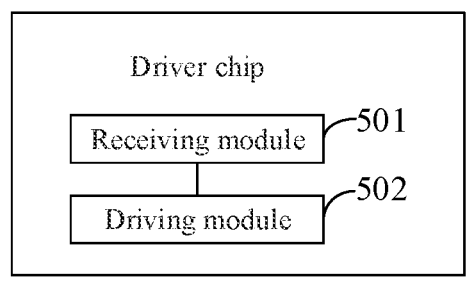
FIG. 17 is a schematic structural diagram of a driver chip according to an embodiment of the present disclosure.

FIG. 17 is a schematic structural diagram of a driver chip according to an embodiment of the present disclosure, and the driver chip may be applied to the display apparatus shown in FIG. 1. Furthermore, the driver chip may be configured to perform the steps executed by the driver chip in the method embodiment as shown in FIG. 2, or may be configured to perform the steps executed by the driver chip in the method embodiment shown in FIG. 3. As shown in FIG. 17, the driver chip may include:

a receiving module 501, configured to receive compressed pixel data, wherein the compressed pixel data is acquired by compressing pixel data of a plurality of first pixels in a display panel, and the plurality of first pixels are disposed in a non-foveal region of the display panel; and a driving module 502, configured to drive the plurality of first pixels by the compressed pixel data.

In summary, the driver chip is provided in the embodiment of the present disclosure. The pixel data received by the driver chip is the compressed pixel data by compression. Since the data volume of the compressed pixel data is relatively small, the bandwidth occupied in a transmission process of the pixel data can be effectively reduced, and the transmission efficiency can be improved.

Referring to FIG. 1, a display apparatus is further provided in an embodiment of the present disclosure. The display apparatus includes, a processor 01, a controller 02, at least one driver chip 03, and a display panel 04.

The processor 01 may be a graphics processing unit (GPU) or an application processor (AP), and the structure of the processor 01 may be as shown in FIG. 14 or FIG. 15. The controller 02 may be a timer controller (TCON), and the structure of the controller 02 may be as shown in FIG. 14, FIG. 15, or FIG. 16. The driver chip 03 may be a source electrode driver circuit, and the driver chip 03 may also be called a driver integrated circuit.

Figure 18:
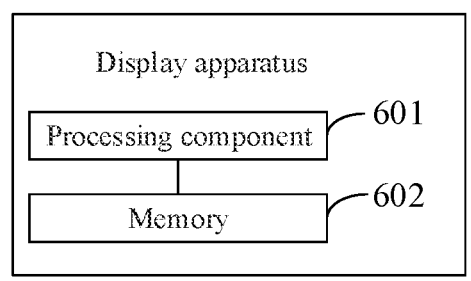
FIG. 18 is a schematic diagram of a display apparatus according to an embodiment of the present disclosure.

FIG. 18 is a schematic structural diagram of another display apparatus according to an embodiment of the present disclosure. As shown in FIG. 18, the display apparatus may include: a processing component 601 and a memory 602 for storing one or more instructions executable by the processing component 601. The one or more instructions in the memory 602, when executed by the processing component 601, cause the processing component 601 to perform the steps performed by the processor, the controller or the driver chip in the above embodiments.

The processing component 601 may be the processor, the controller, or the driver chip in the above embodiments.

Optionally, the display apparatus according to the embodiment of the present disclosure may be any product or part with a display function, such as a liquid crystal display apparatus, electronic paper, an organic light-emitting diode (OLED) display apparatus, a mobile phone, a tablet computer, a television, a display, a notebook computer, a digital photo frame, or a navigator.

Exemplarily, the display apparatus may be an AR or VR device.

A computer-readable storage medium is provided in an embodiment of the present disclosure. The computer-readable storage medium stores one or more instructions therein, wherein the one or more instructions, when executed by a processing component, cause the processing component to perform the steps performed by the transmission component, the steps performed by the controller, or the steps performed by the driver chip in the above embodiments.

The processing component may be the processor, the controller, or the driver chip in the above embodiments.

A computer program product including one or more instructions is provided in an embodiment of the present disclosure. The computer program product, when running on a computer, causes the computer to perform the method for transmitting image data as described in any one of the above method embodiments.

In the present disclosure, the terms "first" and "second" are merely configured to describe but not denote or imply any relative importance. The term "at least one" means one or more, and the term "a plurality of" in the present disclosure means two or more, for example, a plurality of clock calibration circuits mean two or more clock calibration circuits.

It can be understood that "and/or" mentioned herein indicates three relationships. For example, "A and/or B" may indicate that A exists alone, A and B exist simultaneously, or B exists alone. The character "/" generally indicates that the context object is an "or" relationship.

Described above are merely exemplary embodiments of the present disclosure, and are not intended to limit the present disclosure. Within the spirit and principles of the disclosure, any modifications, equivalent substitutions, improvements, and the like are within the protection scope of the present disclosure.

What is claimed is:

1. A method for transmitting image data, applied to a controller in a display apparatus, the controller being connected to at least one driver chip in the display apparatus; and the method comprises:
   acquiring initial image data of a to-be-displayed image in a display panel, wherein the display panel comprises a plurality of pixels, and the initial image data comprises pixel data of the plurality of pixels;
   compressing pixel data of a plurality of first pixels in the initial image data to acquire at least one piece of compressed pixel data, wherein the plurality of first pixels are disposed in a non-foveal region of the display panel, and a plurality of second pixels in the plurality of pixels other than the plurality of first pixels are disposed in a foveal region of the display panel, wherein the non-foveal region comprises a first region, wherein the first region and the foveal region of the display panel are arranged in a pixel column direction; pixels connected to the target driver chip comprise the first pixels and the second pixels, wherein the first pixels and the second pixels are sequentially arranged in a driving direction of a pixel row; and
   sending a power consumption reduction instruction to a target driver chip, the power consumption reduction instruction being configured to instruct the target driver chip to close a target channel, wherein the target driver chip is a driver chip for driving the first pixels and is provided with a plurality of data channels, and the target channel is a channel for receiving the compressed pixel data;
   sending the compressed pixel data to the target driver chip, wherein the compressed image data comprises the at least one piece of compressed pixel data and pixel data of the plurality of second pixels, and the compressed image data is configured for driving the display panel to display by the driver chip;
   sending a power consumption recovery instruction to the target driver chip, the power consumption recovery instruction being configured to instruct the target driver chip to open the target channel; and
   sending the pixel data of the second pixels connected to the target driver chip to the target driver chip; wherein an interval duration between sending the power consumption recovery instruction to the target driver chip and sending the pixel data of the second pixels is greater than or equal to a duration threshold, wherein the duration threshold is determined based on an open duration required for the target driver chip to open a data channel thereof, and the open duration is related to hardware parameters of the target driver chip.

2. The method according to claim 1, wherein
said compressing pixel data of the plurality of first pixels in the initial image data to acquire at least one piece of compressed pixel data comprises:
   compressing pixel data of N rows and M columns of first pixels in the first region to acquire one piece of compressed pixel data, both N and M being integers greater than 1.

3. The method according to claim 1, wherein the non-foveal region comprises a second region, wherein the second region and the foveal region are arranged in a pixel row direction; and
   said compressing pixel data of the plurality of first pixels in the initial image data to acquire at least one piece of compressed pixel data comprises:
   compressing pixel data of M columns of first pixels disposed in a same row in the second region to acquire one piece of compressed pixel data, M being an integer greater than 1.

4. The method according to claim 1, wherein prior to compressing the pixel data of the plurality of first pixels in the initial image data, the method further comprises:
   determining, based on data acquired by a foveal region detection sensor, the foveal region.

5. The method according to claim 1, wherein said compressing pixel data of the plurality of first pixels in the initial image data to acquire at least one piece of compressed pixel data comprises:
  deleting pixel data of at least one first pixel in the pixel data of the plurality of first pixels to acquire at least one piece of compressed pixel data;
  wherein each compressed pixel data is pixel data of one of the first pixels, or a mean value or median value of the pixel data of at least two first pixels.

6. The method according to claim 1, wherein said sending the power consumption recovery instruction to the target driver chip comprises:
  sending a clock training pattern and a link stable pattern to the target driver chip.

7. A non-transitory computer-readable storage medium storing one or more instructions therein, wherein the one or more instructions, when executed by a controller in a display apparatus, cause the controller to perform the method for transmitting image data as defined in claim 1.

8. A controller, wherein the controller is connected to at least one driver chip in a display apparatus; and the controller comprises:
  a processor; and
  a memory configured to store one or more instructions executable by the processor;
  wherein the processor, when loading and executing the one or more instructions, is caused to perform a method for transmitting image data wherein the method comprises:
  acquiring initial image data of a to-be-displayed image in a display panel, wherein the display panel comprises a plurality of pixels, and the initial image data comprises pixel data of the plurality of pixels;
  compressing pixel data of a plurality of first pixels in the initial image data to acquire at least one piece of compressed pixel data, wherein the plurality of first pixels are disposed in a non-foveal region of the display panel, and a plurality of second pixels in the plurality of pixels other than the plurality of first pixels are disposed in a foveal region of the display panel, wherein the non-foveal region comprises a first region, wherein the first region and the foveal region of the display panel are arranged in a pixel column direction; pixels connected to the target driver chip comprise the first pixels and the second pixels, wherein the first pixels and the second pixels are sequentially arranged in a driving direction of a pixel row; and
  sending a power consumption reduction instruction to a target driver chip, the power consumption reduction instruction being configured to instruct the target driver chip to close a target channel, wherein the target driver chip is a driver chip for driving the first pixels and is provided with a plurality of data channels, and the target channel is a channel for receiving the compressed pixel data;
  sending the compressed pixel data to the target driver chip, wherein the compressed image data comprises the at least one piece of compressed pixel data and pixel data of the plurality of second pixels, and the compressed image data is configured for driving the display panel to display by the driver chip;
  sending a power consumption recovery instruction to the target driver chip, the power consumption recovery instruction being configured to instruct the target driver chip to open the target channel; and
  sending the pixel data of the second pixels connected to the target driver chip to the target driver chip; wherein an interval duration between sending the power consumption recovery instruction to the target driver chip and sending the pixel data of the second pixels is greater than or equal to a duration threshold, wherein the duration threshold is determined based on an open duration required for the target driver chip to open a data channel thereof, and the open duration is related to hardware parameters of the target driver chip.

9. A display apparatus, comprising: a processor, a controller, at least one driver chip, and a display panel;
  wherein the controller is the controller as defined in claim 8; and the driver chip is a driver chip connected to the display panel, and the driver chip comprises:
  a processor; and
  a memory configured to store one or more instructions executable by the processor;
  wherein the processor, when loading and executing the one or more instructions, is caused to perform a method for displaying images comprising:
  receiving compressed pixel data, wherein the compressed pixel data is acquired by compressing pixel data of a plurality of first pixels in the display panel, and the plurality of first pixels are disposed in a non-foveal region of the display panel; and
  driving the plurality of first pixels by the compressed pixel data.

10. The controller according to claim 8, wherein
  the processor, when loading and executing the one or more instructions, is caused to perform:
  compressing pixel data of N rows and M columns of first pixels in the first region to acquire one piece of compressed pixel data, both N and M being integers greater than 1.

11. The controller according to claim 8, wherein the non-foveal region comprises a second region, wherein the second region and the foveal region are arranged in a pixel row direction; and
  the processor, when loading and executing the one or more instructions, is caused to perform:
  compressing pixel data of M columns of first pixels disposed in a same row in the second region to acquire one piece of compressed pixel data, M being an integer greater than 1.

12. The controller according to claim 8, wherein the processor, when loading and executing the one or more instructions, is caused to perform:
  determining, based on data acquired by a foveal region detection sensor, the foveal region.

13. The controller according to claim 8, wherein the processor, when loading and executing the one or more instructions, is caused to perform:
  determining, based on data acquired by a foveal region detection sensor, the foveal region.

14. The controller according to claim 8, wherein the processor, when loading and executing the one or more instructions, is caused to perform:
  deleting pixel data of at least one first pixel in the pixel data of the plurality of first pixels to acquire at least one piece of compressed pixel data;
  wherein each compressed pixel data is pixel data of one of the first pixels, or a mean value or median value of the pixel data of at least two first pixels.

15. The controller according to claim 8, wherein the processor, when loading and executing the one or more instructions, is caused to perform:

sending a clock training pattern and a link stable pattern to the target driver chip.

* * * * *